United States Patent [19]

Golike

[11] Patent Number: 4,597,920

[45] Date of Patent: Jul. 1, 1986

[54] SHRINK FILMS OF ETHYLENE/α-OLEFIN COPOLYMERS

[75] Inventor: Ralph C. Golike, Wilmington, Del.

[73] Assignee: E. I. Du Pont de Nemours and Company, Wilmington, Del.

[21] Appl. No.: 598,476

[22] Filed: Apr. 9, 1984

Related U.S. Application Data

[63] Continuation-in-part of Ser. No. 415,703, Sep. 7, 1982, abandoned, which is a continuation-in-part of Ser. No. 256,812, Apr. 23, 1981, abandoned.

[51] Int. Cl.$^4$ .................... C08J 5/18; C08L 23/18; C08F 10/14
[52] U.S. Cl. .................... 264/22; 264/288.4; 264/289.6; 264/290.2; 525/240; 526/348.1; 526/348.2; 526/348.4
[58] Field of Search ............... 526/348.1, 348.6, 348.2; 525/240; 264/210.1, 288.4, 289.6, 22

[56] References Cited

U.S. PATENT DOCUMENTS

| | | | |
|---|---|---|---|
| 3,141,912 | 7/1964 | Goldman et al. | 264/546 |
| 3,299,194 | 1/1967 | Golike | 264/210 |
| 3,663,662 | 5/1972 | Golike et al. | 525/240 |
| 4,076,698 | 2/1978 | Anderson et al. | 526/348.6 |
| 4,128,607 | 12/1978 | Shiomura et al. | 526/124 |
| 4,205,021 | 5/1980 | Morita et al. | 525/240 |

FOREIGN PATENT DOCUMENTS 53-75278  7/1978  Japan.

OTHER PUBLICATIONS

Dowlex ® Polyethylene Resins Bulletin, pp. 1, 2, 11, Dow Chem. Co., 1979.

*Primary Examiner*—Carman J. Seccuro

[57] ABSTRACT

A shrink film having high optical clarity, good shrink properties, and good mechanical properties is obtained by stretching biaxially, without prior crosslinking, a film made of a copolymer of ethylene with at least one $C_8$–$C_{18}$ α-olefin, which copolymer has two distinct crystallite melting points below 128° C., the difference between these melting points being at least 10° C., and stretching being carried at a temperature within the range defined by these melting points. The above copolymer may be blended with a homopolymer of an α-olefin or copolymer with another α-olefin or another ethylenically unsaturated comonomer, which may constitute up to about 95 weight % of the blend. The shrink film of this invention is particularly suitable for wrapping consumer goods which have to maintain good sales appeal.

6 Claims, 3 Drawing Figures

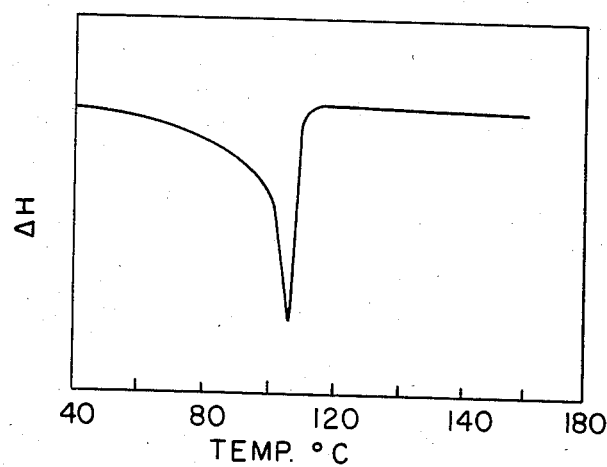
F I G. 1
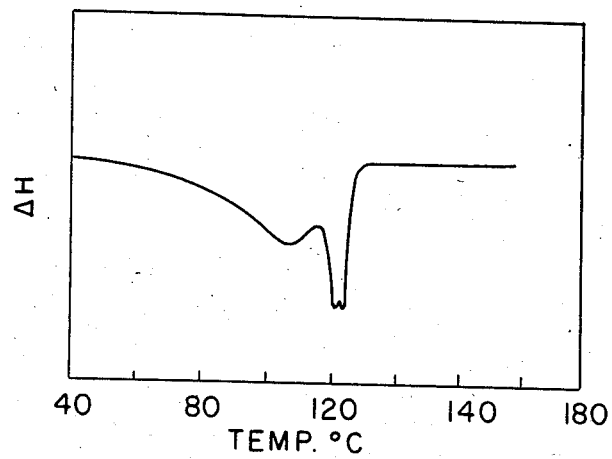
F I G. 2
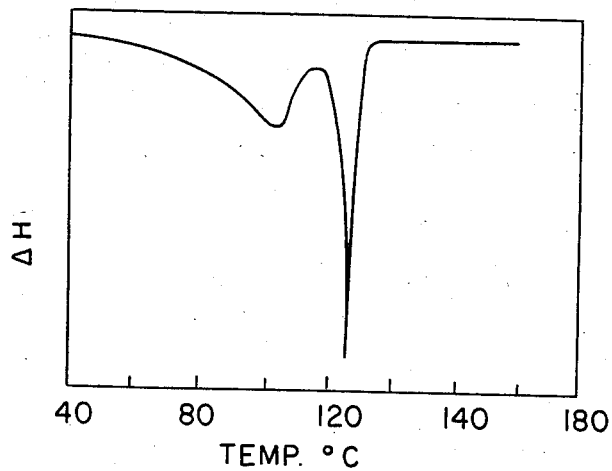
F I G. 3

SHRINK FILMS OF ETHYLENE/α-OLEFIN COPOLYMERS

CROSS-REFERENCE TO RELATED APPLICATION

This is a continuation-in-part of my application Ser. No. 415,703, filed Sept. 7, 1982, now abandoned, which was a continuation-in-part of my application Ser. No. 256,812 filed Apr. 23, 1981, and now abandoned.

BACKGROUND OF THE INVENTION

This invention relates to shrink films based on selected linear, low density copolymers of ethylene with certain α-olefins, which films have outstanding optical properties and a good balance of other physical properties and shrink properties.

Shrink films of oriented polyethylene and various copolymers of ethylene are well known; see, for example, U.S. Pat. Nos. 3,299,194 to Golike and 3,663,662 to Golike et al.

A polyolefin shrink film, used mainly for wrapping food products and a variety of consumer goods, should have good optical clarity; otherwise, the consumer appeal of the packaged article within the wrapping would be diminished or lost. For practical applications, the film should shrink within a temperature range of approximately 100° to 120° C. to a degree of at least 15% in the direction of orientation and with sufficient force to provide a tight-fitting skin around the article enclosed within the wrapping. The film also should have good mechanical properties, such as tensile strength and modulus, so that it will stretch and then shrink without tearing, will maintain good physical contact with the packaged article at all times, and will not get easily damaged in handling.

One prior art technique for making ethylene polymer shrink films required polymer crosslinking prior to stretching in order to impart to the film greater mechanical strength. This crosslinking usually was accomplished by irradiation with high energy particles or with gamma rays.

In order to obtain a resin composition yielding films with satisfactory properties for shrink film applications without crosslinking prior to stretching, it has been generally necessary in the past to blend low density and high density ethylene polymers. Naturally, it would be desirable to be able to make shrink films from a single low density ethylene polymer resin. In this context, the term "low density" means 0.940 g/cm³ or less, and "high density" means more than 0.940 g/cm³.

A recent commercial offering of the Dow Chemical Company, DOWLEX® low density "polyethylene" resins, are described in a Dow bulletin as giving blown film having excellent optics and superior strength properties. Yet, the same bulletin indicates that these resins are not suitable for making shrink films because they will shrink less than conventional low density polyethylene film and will shrink within a narrower temperature range. DOWLEX® resins are in fact copolymers of ethylene with 1-octene. Although the bulletin does not explain by what technique DOWLEX® experimental shrink films were made, it is believed that they were irradiated prior to stretching. Conventional low density polyethylene films must be crosslinked prior to stretching, and prior irradiation was the usual crosslinking technique practiced by the shrink film industry.

U.S. Pat. No. 4,205,021 to Morita et al. discloses a class of ethylene/α-olefin copolymers having long-chain branchings, as reflected by their low value of $g\eta = [\eta]/[\eta]_l$ of 0.05-0.78, wherein $[\eta]$ is the intrinsic viscosity of the copolymer and $[\eta]_l$ is the intrinsic viscosity of a linear polyethylene having the same weight average molecular weight. Those copolymers are said to give films having good transparency, while copolymers having high $g\eta$, 0.80 to 1.0, are said to have poor transparency. Morita et al. are not concerned with shrink films, however.

SUMMARY OF THE INVENTION

According to this invention, there is now provided a shrink film having high optical clarity, good shrink properties, and good mechanical properties, said film being obtained by stretching, without prior crosslinking, at least three times its original linear dimension in at least one direction a film made of the following homogeneous polymeric composition:
(1) 5-100 weight % of at least one linear copolymer of ethylene with at least one $C_8$-$C_{18}$ α-olefin, said copolymer having the following characteristics:
  (a) melt index of 0.1-4.0 g/10 min.;
  (b) density of 0.900 to 0.940 g/cm³;
  (c) stress exponent above 1.3; and
  (d) two distinct crystallite melting regions below 128° C. as determined by differential scanning calorimetry (DSC), the temperature difference between those regions being at least 10° C.; and
  (e) $G = [\eta]/[\eta]_{lv}$ of about 0.85 to 1.00, wherein $[\eta]$ is the intrinsic viscosity of the copolymer and $[\eta]_{lv}$ is the intrinsic viscosity of linear homopolyethylene having the same viscosity-average molecular weight; and
(2) 0-95 weight % of at least one polymer selected from the group consisting of α-olefin homopolymers and copolymers with one another or with another ethylenically unsaturated comonomer, said polymer having only one crystallite melting point; with the proviso that stretching is done at a temperature within the range defined by the two crystallite melting points of the linear copolymers of ethylene with $C_8$-$C_{18}$ α-olefin of the above paragraph (1) but above any temperature at which tearing may occur.

BRIEF DESCRIPTION OF THE DRAWINGS

The drawings represent DSC plots for three different resins.

FIG. 1 is the plot for polyethylene,

FIG. 2 for a commercial linear ethylene/1-octene copolymer, and

FIG. 3 for a blend of high and low density ethylene polymers.

DETAILED DESCRIPTION OF THE INVENTION

The principal resin used in the compositions of the present invention is a linear copolymer of ethylene with an α-olefin. Typical α-olefins which can be copolymerized with ethylene are 1-octene, 1-decene, 1-undecene, 1-dodecene, and 1-hexadecene. The copolymers are prepared at a low to moderate pressure (about 29.4 MPa) in the presence of a coordination catalyst according to the generally known technique of the so-called Ziegler and Natta processes. Typical catalysts are various organoaluminum, organotitanium, and organovanadium compounds, and especially titanium-modified organoaluminum compounds. The preparation of ethylene copolymers with α-olefins is taught, for example, in U.S. Pat. No. 4,076,698 to Anderson et al.

The determination of [η] and [η]$_{lv}$ for the calculation of G is carried out according to well-known techniques, for example, as described in E. E. Drott et al., *J. Polym. Sci.*, A-2, 8, 1361, 1373 (1970) and M. Kurata et al. *J. Polym. J.*, 6(3), 1729–748 (1972). Intrinsic viscosity of the copolymer [η] is determined, for example, in trichlorobenzene at 135° C. The viscosity average molecular weight of the copolymer Mv is determined by gel permeation chromatography, as taught in the above references. The intrinsic viscosity [η]$_{lv}$ is then calculated by the well-known Mark-Houwink equation with constants for linear polyethylene $$[\eta]^{135} = 4.34 \times 10^{-4} M^{0.724}, TCB$$

Where M=M$_v$, and $$[\eta]^{135} = [\eta]_{lv} TCB$$

Although G=[η]/[η]$_{lv}$ is not exactly the same as gη=[η]/[η]$_l$ of Morita et al., these values are virtually the same because the numerators in both equations are the same, and the denominators are nearly the same since linear polyethylenes having the same weight-average molecular weights also have nearly the same viscosity-average molecular weights. Accordingly, the copolymers useful in the present invention are different from those of Morita et al. in that they are characterized by at most a small amount of branching other than short-chain branching derived from the α-olefin comonomer.

Suitable commercially available copolymers of ethylene with higher α-olefins include the above-mentioned DOWLEX ® resins, and the preferred copolymer is that with 1-octene. As the proportion of α-olefin in the copolymer or the molecular weight of α-olefin increases, the density of the copolymer decreases. For 1-octene, the amount of this α-olefin in the copolymer normally will be between about 3 and 16 weight percent. However, the amount of each such comonomer will be so chosen that proper values of melt index, density, and stress exponent of the copolymer are obtained. These proportions are easily established from known relationships and can be verified experimentally by means of standard techniques. Thus, the melt index is determined according to ASTM method D1238 (condition E) and the density according to ASTM D1505. The stress exponent is the slope of the plot of log flow rate versus log extrusion force. Since the plot is not linear, the slope is determined according to ASTM D1238 using 2160 g and 640 g weights, both at 190° C.

The copolymers should give two distinct crystallite melting peaks, which means that they have two different groups of crystallites, each having its own distinct melting region. For ethylene/1-octene copolymers, such regions will be at about 107° C. and 125° C. FIG. 1 is a typical DSC plot of ΔH in milliwatts vs. temperature in °C. for conventional polyethylene having a density of 0.917 (Resin C in Table I, below). This polymer has only one peak, which lies at about 107° C. A DSC plot for DOWLEX ® 2045 ethylene/1-octene copolymer (d=0.920) is presented in FIG. 2. This is Resin A in Table I. The higher temperature peak is in reality a doublet, and the higher melting temperature of the doublet is taken as characteristic of this peak. FIG. 3 is a DSC plot for a blend of linear high density ethylene/1-octene copolymer (Resin B in Table I) with the conventional polyethylene. The blend density is 0.926. It can be seen that the peaks of the blend correspond to those of the DOWLEX ® resin shown in FIG. 2. DSC is a well-known technique for measuring polymer crystallite melting temperatures. Under the standard operating conditions, the cooling rate of the sample is 10° C./min, and the heating rate of the sample during the measuring operation is 10° C./min. Linear copolymers of ethylene with 1-octene or another α-olefin, wherein the α-olefin comonomer is present in such small amounts that a second DSC peak is not observed are not suitable in the present invention. The existence of two crystallite melting regions in the ethylene/α-olefin copolymers is their most outstanding characteristic because films made from these copolymers can be oriented between those two temperatures. Shrink films made from these copolymers have excellent properties, quite comparable with those of shrink films made from blends of low density and high density ethylene polymers, for example, those described in U.S. Pat. No. 3,299,194.

Some commercial ethylene/α-olefin copolymers contain additives such as, for example, nucleating agents or slip-improving additives, which can to some extent mask or distort the lower melting peak. When the presence of such additives is suspected, it is useful to completely melt the sample, then anneal it just below its primary melting temperature, and cool it to room temperature before performing the DSC determination. A polymer sample treated in this manner clearly shows both DSC peaks.

It has been found that the presence of as little as 5 weight percent of an ethylene/α-olefin copolymer of this class in a homogeneous blend with an α-olefin homopolymer or copolymer having only one crystallite melting region can sometimes improve the properties of the latter polymer so significantly that excellent shrink films having desirable physical properties, including high optical clarity, can be made therefrom. Such homopolymers or copolymers can be both high density and low density, linear and branched, made at high pressure or at low pressure. The copolymers may be those with any comonomer, including for example, another α-olefin, a vinyl ester, alkyl acrylate or methacrylate, or acrylonitrile. Many such polymers are commercially available from several sources. The blends can be prepared by any conventional technique capable of producing a uniform, homogeneous material.

Film is made from the above copolymers or blends by a suitable melt extrusion process. The film is either tubular or flat. It is stretched, without prior irradiation or crosslinking of any kind, preferably biaxially, in the plane of the film to the extent of at least 3 times in each direction, preferably at least 5 times. A convenient process, which combines extrusion and orientation of polymeric films is described in U.S. Pat. No. 3,141,912 to Goldman et al. Stretching is done, as stated above, at a temperature within the range defined by the lower and the higher melting points of the linear ethylene/α-olefin copolymers used in this process. However, the full range of those temperatures may not be practical because, depending on the particular equipment and technique used, tearing of the film may occur at the lower end of that range. A person not having a scientific or technical degree would be able to readily determine whether or not tearing occurs at a given temperature or to determine the lowest temperature at which tearing does not occur, if such a determination were important. Above the higher limit of the range the structural integrity of the film suffers during stretching because the film then is in a soft, molten condition. It is recognized that the presence of another polymer in a blend with linear ethylene/α-olefin copolymer may also affect the film's response to temperatures, but the above-indicated useful temperature range still is considered to be practical for such blends.

When subjected to a temperature of about 100° to 120° C., an oriented, unconstrained film will shrink at least about 15%, and this shrinking will be accompanied by a considerable force, usually at least 1400 KPa. The preferred shrink films will shrink at least 30% at a temperature just below the higher crystallite melting peak, at least 15% at 100° C. The shrink force at 100° C. should be greater than about 350 kPa. Haze should be less than 4%, especially less than 2%. Gloss should be greater than 90, preferably greater than 110.

A limited amount of crosslinking can be introduced after stretching but prior to shrinking, if desired. This can be accomplished with a minimum amount of high energy radiation, normally less than 8 Mrad, as described, for example, in U.S. Pat. No. 3,663,662 to Golike et al. Irradiated oriented films have improved melt strength and are less sensitive to temperature differences in the shrink tunnel.

This invention is now illustrated by the following representative examples, where all parts and proportions are by weight. In all cases the thickness of shrink film was about 0.025 mm.

All data obtained in units other than SI have been converted to SI units.

The shrinkage of oriented films was determined by scribing a fixed length, usually 100 mm, on a strip of unconstrained film in a 100° C. temperature bath for 10 seconds and calculating the shrinkage as the percent change of length.

The shrink force was determined according to ASTM 2838. Modulus, tensile strength, and elongation at break were determined according to ASTM D412.

The ethylene resins used in the examples are listed in Table I, below:

TABLE I

| Resin | Melt temp., °C. (by DSC) | Density, g/cm³ | Stress exponent | Melt index | 1-octene % | Description |
|---|---|---|---|---|---|---|
| A | 124, 107 | 0.920 | 1.4 | 1.0 | 14 | Linear, low density copolymer |
| B | 126 | 0.950 | 1.8 | 0.45 | 1.7 | Linear, high density copolymer |
| C | 103 | 0.917 | — | 4.0 | — | Branched, low density |
| D | 126 | 0.940 | 1.9 | 0.45 | 3.6 | Linear, low density copolymer |

The value of $G=[\eta]/[\eta]_{lv}$ was found for resin A to be 0.96. In the calculation of G, as explained earlier, $[\eta]$ was determined in trichlorobenzene at 135° C. to be 1.65 dL/g. The viscosity-average molecular weight of the copolymer $M_v$ was determined to be 93,000. The value of $[\eta]_{lv}$ calculated from this by the Mark-Houwink equation was 1.72 dL/g. Since G was very close to 1, resin A had essentially no branching other than short-chain branching derived from 1-octene.

EXAMPLE 1

Oriented tubular film was prepared by the process of U.S. Pat. No. 3,141,912 to Goldman. A 5 cm extruder operated at 230° C. and at a feed rate of 0.9 kg of ethylene polymer resin per hour produced film at the rate of 2.7 m/min. The hot tubular film was quenched, reheated to 115°–120° C., and blown at an internal pressure of 2 kPa. The blowing was controlled with a quench ring to give a fivefold stretch in the transverse direction. The take-up rolls were operated to give a fivefold stretch in the longitudinal direction.

Shrink film made from resin A according to the present invention was compared with a prior art shrink film made from a blend of resins B and C (in a respective ratio of 26:74) according to the teachings of U.S. Pat. No. 3,299,194 to Golike. The films were placed about objects, hot wire sealed, and shrunk in a tunnel maintained at 167° C. The appearance of packages in both cases was identical. The properties of both shrink films are compared in Table II, below. All properties other than haze and gloss are given as a ratio: machine direction/transverse direction.

TABLE II

| Resin Type* | A | B + C (26:74) |
|---|---|---|
| MODULUS, MPa | 295/260 | 360/330 |
| TENSILE, MPa | 115/108 | 69/56 |
| ELONGATION, % | 240/195 | 152/128 |
| TEAR, g/mm | 1480/1280 | 267/462 |
| SHRINKAGE (100° C.) % | 19/25 | 27/30 |
| SHRINK FORCE (100° C.) kPa | 1810/3590 | 2960/3450 |
| HAZE, % | 3.5 | 3.6 |
| GLOSS | 85 | 93 |

*See Table I for resin description

EXAMPLE 2

Resin blends were prepared as shown in Table III, below, melt blended in a standard single-screw mixing extruder, and melt pressed into 5×5-cm films. These were stretched fivefold at 120° C. in each direction in a laboratory stretcher (T.M. Long Co., Inc., Somerville, N.J.).

The physical properties of the films of this invention (A/B and A/D blends) are compared in Table III with those of prior art films made of ethylene polymer blends (B/C and C/D blends). The improvement of the physical properties, especially of optical properties, in the films of the present invention is apparent.

TABLE III

| Resin Blend* | | | | |
|---|---|---|---|---|
| Higher Density Component | | | | |
| Type** | B | D | B | D |
| % | 26 | 37 | 20 | 30 |
| Lower Density Component | | | | |
| Type** | C | C | A | A |
| % | 74 | 63 | 80 | 70 |
| FILM PROPERTIES | | | | |
| MODULUS, MPa | 367 | 458 | 583 | 508 |
| TENSILE, MPa | 82 | 64 | 106 | 119 |
| ELONGATION, % | 80 | 106 | 131 | 114 |
| TEAR, g/mm | 295 | 336 | 380 | 380 |
| SHRINKAGE | 8 | 8 | 6 | 10 |

TABLE III-continued

| | | | | |
|---|---|---|---|---|
| (100° C.) % SHRINK FORCE | 1170 | 965 | 1420 | 1240 |
| (100° C.) kPa HAZE, % | 6.5 | 4.3 | 3.8 | 2.4 |
| GLOSS | 65 | 66 | 73 | 121 |

*Proportions were chosen to give blend density of 0.926 g/cm³
**See Table I for resin description

EXAMPLE 3

Oriented films were prepared from blends of resins A and C (see Table I). Stretching was carried out at 110°–112° C. using the same technique and equipment as in Example 2. The physical properties of the stretched films are shown in Table IV, below. It can be seen that all the properties change as the proportion of the conventional low density polyethylene (Resin C) increases. The most striking change is the large decrease of the shrink force with retention of the high level of shrinkage.

TABLE IV

| Proportion of Resin C in A/C resin blend, % | 0 | 25 | 50 | 75 |
|---|---|---|---|---|
| FILM PROPERTIES | | | | |
| MODULUS, MPa | 364 | 273 | 240 | 240 |
| TENSILE, MPa | 144 | 69 | 42 | 30 |
| ELONGATION, % | 129 | 162 | 144 | 131 |
| TEAR, g/mm | 104 | 510 | 580 | 260 |
| SHRINKAGE (100° C.) % | 16 | 20 | 16 | 18 |
| SHRINK FORCE (100° C.) kPa | 2250 | 2100 | 1670 | 1210 |
| HAZE, % | 1.0 | 1.7 | 2.4 | 1.6 |
| GLOSS | 140 | 139 | 119 | 100 |

EXAMPLE 4

Stretching of films of resin A in the manner described in Example 2 was attempted at different temperatures. The following results were obtained:

| Temperature °C. | Behavior |
|---|---|
| 100 | Tore. |
| 105 | Tore. |
| 110 | Almost stretched, tear. |
| 112 | Some stretch, some tear - marginal. |
| 115 | Stretched - good sample. |
| 120 | Stretched - good sample. |
| 125 | Stretches but hazy and soft. Film unacceptable. |
| 130 | Melts, holes in film. |

Acceptable stretched film was obtained, as can be seen, at temperatures within the range defined by resin A's melting points.

I claim:

1. In a process for making a shrink film having high optical clarity, good shrink properties, and good mechanical properties, said film being made by stretching a polymer film at least three times its original linear dimension in at least one direction,
   the improvement of stretching a film made of the following homogeneous composition:
   (1) 5–100 weight % of at least one linear copolymer of ethylene with at least one $C_8$–$C_{18}$ α-olefin, said copolymer having the following characteristics:
      (a) melt index of 0.1–4.0 g/10 min.;
      (b) density of 0.900 to 0.940 g/cm³;
      (c) stress exponent above 1.3; and
      (d) two distinct crystalline melting regions below 128° C. as determined by differential scanning calorimetry (DSC), the temperature difference between those regions being at least 10° C.;
      (e) $G = [\eta]/[\eta]_{lv}$ of about 0.85 to 1.00, wherein $[\eta]$ is the intrinsic viscosity of the copolymer and $[\eta]_{lv}$ is the intrinsic viscosity of linear homopolyethylene having the same viscosity-average molecular weight; and
   (2) 0.95 weight % of at least one polymer selected from the group consisting of α-olefin homopolymers and copolymers with one another or with another ethylenically unsaturated comonomer, said polymer having only one crystalline melting point;
   with the stretching being carried out without prior crosslinking and at a temperature within the range defined by the two crystallite melting points of the ethylene copolymer with $C_8$–$C_{18}$ α-olefin of the above paragraph (1) but above any temperature at which tearing may occur.

2. A process of claim 1, wherein the film is made of a copolymer of ethylene with 1-octene.

3. A process of claim 2, wherein the proportion of 1-octene is about 3–16 weight percent.

4. A process of claim 1, wherein the film is made of a blend of a copolymer of ethylene with 1-octene having two crystallite melting points with a copolymer of ethylene with 1-octene having only one crystallite melting point by differential scanning calorimetry.

5. A process of claim 1, wherein the film is stretched biaxially to the extent of at least five times in each direction.

6. A process of claim 5, wherein the film is subjected after stretching but prior to shrinking to high energy radiation in an amount of less than about 8 Mrad.

* * * * *